INVENTOR.
STAFFORD P. WALSH
BY Carlos P. Griffin
ATTORNEY.

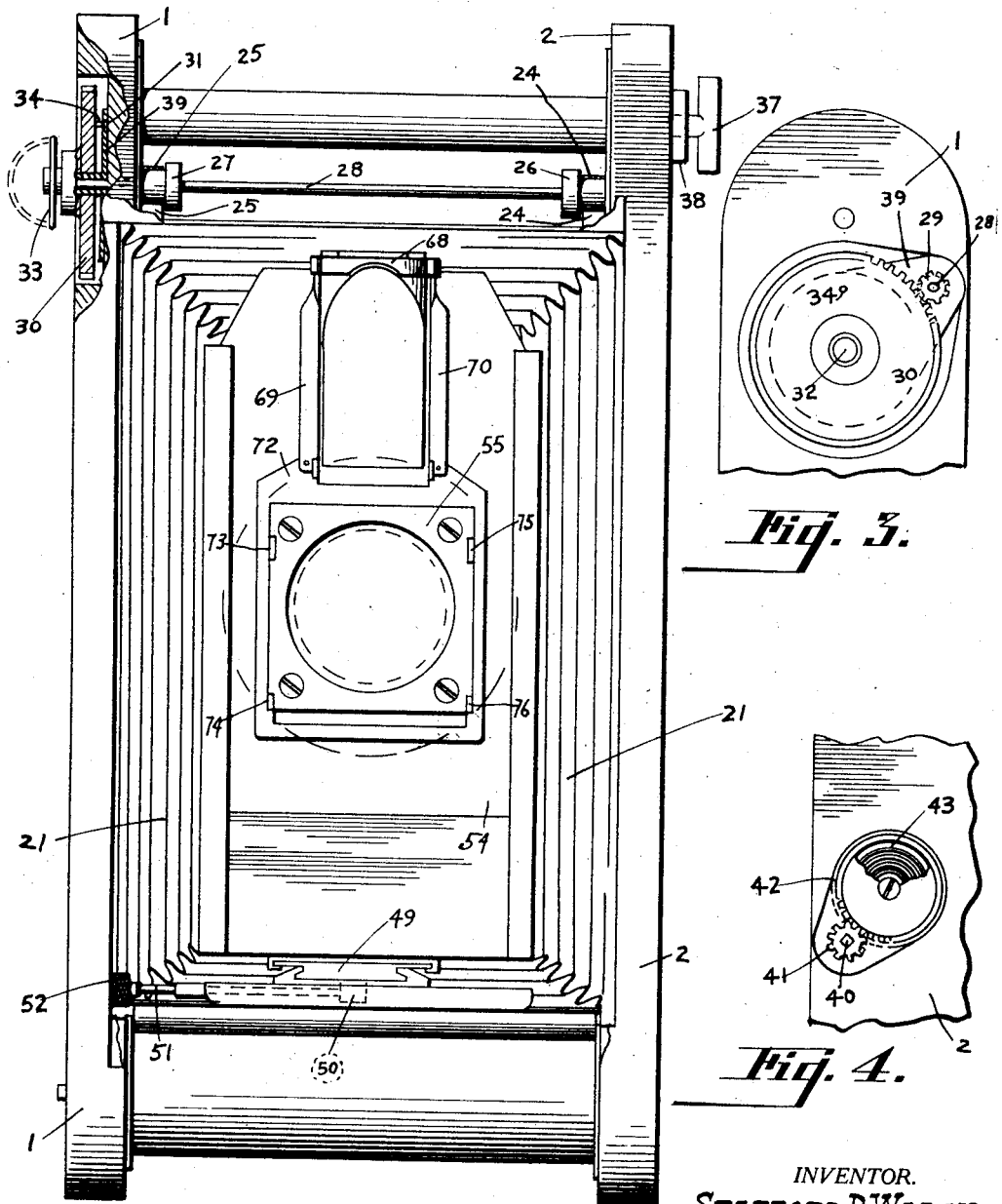

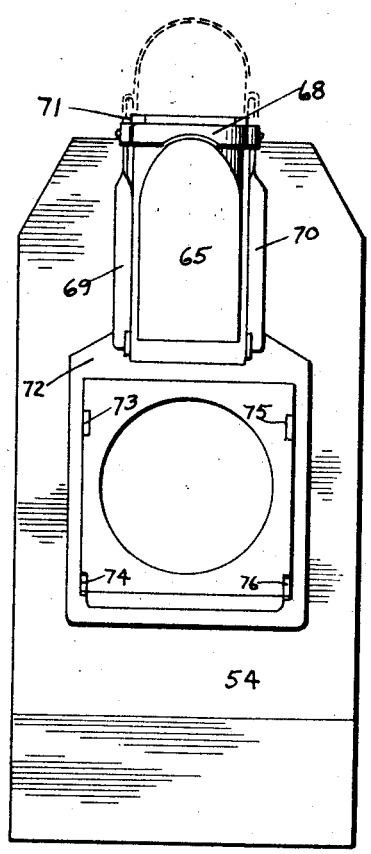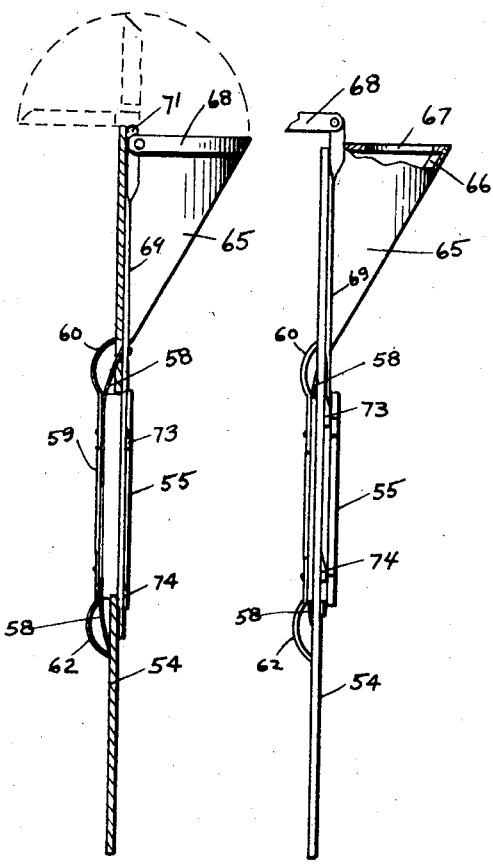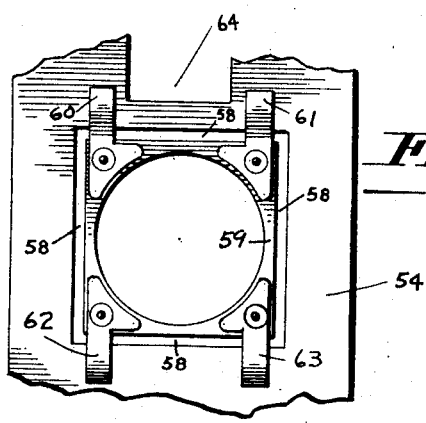

the same portion
UNITED STATES PATENT OFFICE.

STAFFORD P. WALSH, OF SAN FRANCISCO, CALIFORNIA.

FOCUSING ATTACHMENT FOR CAMERAS.

1,314,030.  Specification of Letters Patent.  Patented Aug. 26, 1919.

Application filed May 15, 1918. Serial No. 234,765.

*To all whom it may concern:*

Be it known that I, STAFFORD P. WALSH, citizen of the United States, residing at San Francisco, in the county of San Francisco, State of California, have invented a new and useful Focusing Attachment for Cameras, of which the following is a specification in such full and clear terms as will enable those skilled in the art to construct and use the same.

This invention relates to a focusing device for cameras, and its object is to provide means whereby the user may at once determine the proper position of the lens for correct focus as well as the position of the camera to bring the image of the object to be photographed to the desired position upon the focusing screen previous to the exposure and thereafter upon the sensitized film or plate.

Another object of the invention is to provide a focusing arrangement which will enable any kind of a photographic camera to be focused while the sensitized film or plate is in position in the camera, a suitable opaque screen being used to protect the film or plate while focusing and to act as a screen by the use of which it may be determined when the correct focus has been obtained, which screen is removed when the picture is to be taken.

Another object of the invention is to adjust the position of the lens with respect to the screen while the camera is being focused to compensate for the difference in position of the sensitized surface of the film or plate and the focusing screen surface when the latter is in position for focusing.

Another object of the invention is to so position the focusing attachment as to enable the screen upon which the image is focused to be directly viewed by the operator, if desired, thereby dispensing with refracting devices while viewing the screen to determine the correct focus, although a mirror is used for greater convenience in focusing and for the purpose of reversing the appearance of the picture shown on the focusing screen so that it will appear to be in the same position as the object being photographed appears when viewed by the eye directly, therefore, printed matter or characters coming within the field of view will not appear reversed on the focusing screen but in the proper position for reading.

The invention consists of interposing immediately in front of the sensitized film or plate, while such film or plate is in the camera in position for exposure, an opaque slide or a curtain having a white or a light colored surface facing the camera lens. This slide or curtain acts as a screen upon which the image of the object to be photographed, when projected thereon by the lens, may be viewed through a suitable aperture, which is provided with a light tight cover for closing the same when not in use, for the purpose of determining when the lens is in the proper position for correct focus. A mirror is used in conjunction with the viewing aperture for more conveniently viewing the focusing screen and also for reversing the appearance of the projected image, as regards right and left, as the picture shown upon the screen appears in a reversed position when viewed directly. Means are also provided, in conjunction with the operation of the cover used to close the viewing aperture, to compensate for the difference in distance from the lens to the sensitized surface of the film or plate and to the front surface of the focusing screen respectively, by moving the lens forward through an equivalent distance, when focusing, by opening the cover and afterward retracting the lens before the exposure is made, by closing the cover. It is obvious that this compensation may be effected in a similar manner by means acting independent of the viewing aperture cover.

Other objects of the invention will appear as the description proceeds.

An embodiment of the invention is shown in the drawings in which the same reference numeral is applied to the same portion throughout, but I am aware that there may be modifications thereof.

Fig. 2 is a front elevation of the camera with the lens removed therefrom.

Fig. 3 is a side elevation of a portion of the camera showing the gears used for winding and holding the focusing screen in position for focusing and also for protecting the sensitized film.

Fig. 4 is a side elevation of a portion of the camera showing the spring and gears used to roll up the focusing screen when it is not in use.

Fig. 5 is an enlarged front elevation of the front board plate of the camera showing the means used for moving the lens forward when the focusing screen is being used.

Fig. 6 is a vertical sectional view of a portion of the front board plate of the camera showing the lens holding frame retracted in position ready for exposing the film.

Figure 1:
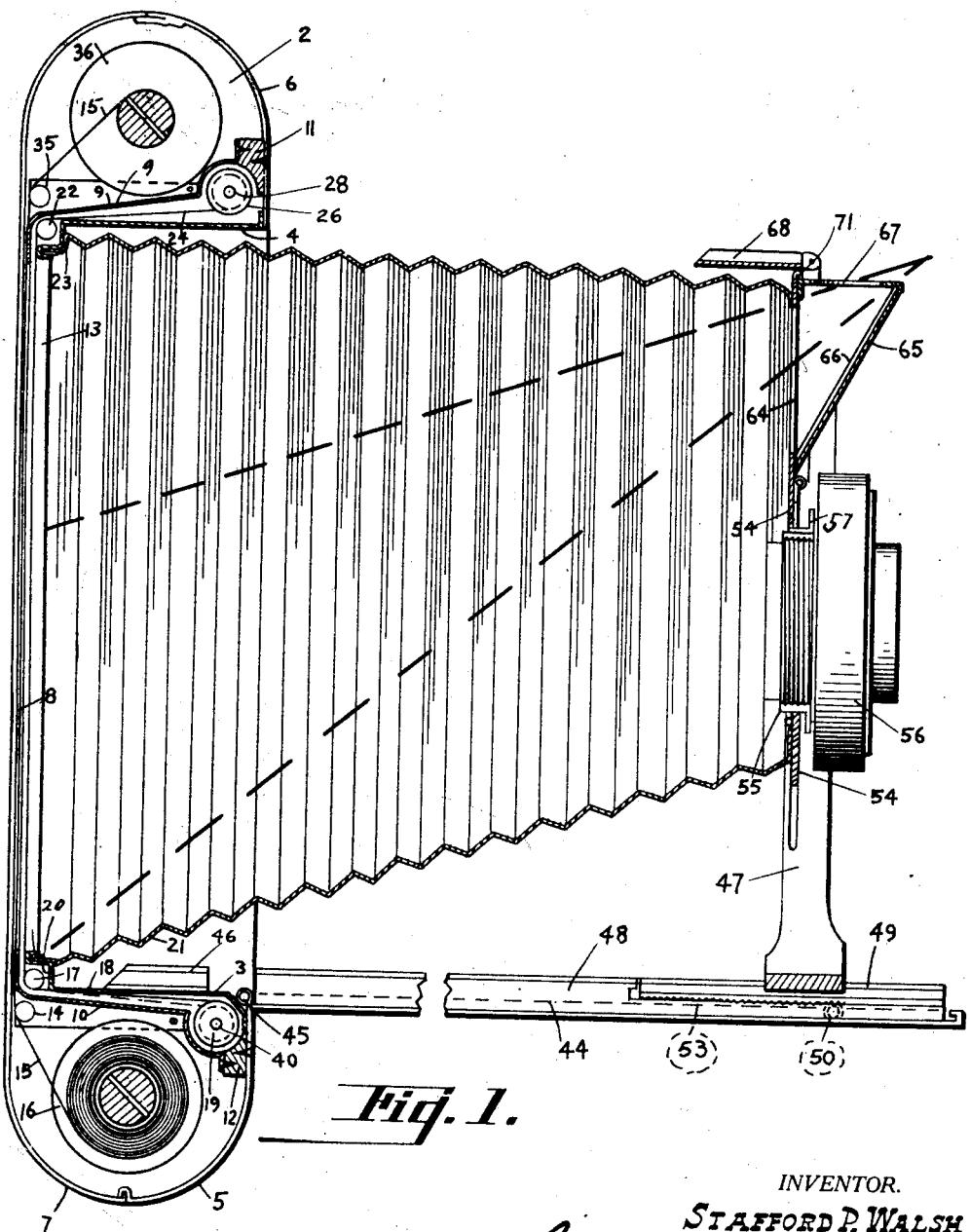
Figure 1 is a longitudinal vertical section through the camera illustrating the position occupied by the screen, the rollers operating it and the viewing aperture provided with its mirror and cover.

Fig. 7 is a side elevation of the front board plate of the camera showing the lens holding frame moved forward in position to focus the image projected by the lens upon the focusing screen, and Fig. 8 is a back view of a portion of the front board plate showing the back of the lens holding plate, the annular opening therein, and the springs for returning it to its retracted position when the viewing aperture is closed; and also the flexible septum used for preventing the entrance of any light into the bellows while permitting the movement of the lens holding frame.

The camera frame consists of two side members 1 and 2 which are connected together by means of the horizontally extending plates 3 and 4 and by the casing parts 5 and 6, a slidably removable casing 7 forming the back of the camera, all of which construction is well known in the art and forms no part of the present invention.

At the back of the side members 1 and 2, there is a plate 8 which connects the side members and which forms the track in back of which the film passes, and which also has an opening therein forming the picture window through which the picture is projected by the lens upon the sensitized film.

At the top and bottom of the plate 8 there are forwardly extending aprons as illustrated at 9 and 10, which aprons are secured to the cross bars 11 and 12 at the front of the camera frame, the object being to prevent any light from reaching the film while the focusing screen is in use. Adjacent the lower corner of the plate 8 is a roller 14 around which the film 15 from the spool 16 passes, while just above the lower corner of this plate is a small roller 17 around which the opaque focusing screen 18 passes from the roller 19 upon which it is wound when in its normal or open position. The roller 17 lies under an upturned portion 20 of the plate 3. The plates 3 and 4, which are secured to the casings 5 and 6, are the extended ends of a plate or frame 13 which also connects the side members 1 and 2. This plate or frame forms a base for the attachment of the bellows 21 at the back of the camera, and also serves as a track on which the focusing screen rests when it is drawn into position for focusing. The back surface of the plate 13 and the front surface of the plate 8 are slightly separated for the purpose of providing space for the unobstructed operation of the focusing screen and also for the purpose of forming at each side a groove or channel through which the focusing screen 18 passes when being closed for focusing. These two grooves act as guides for the focusing screen and also form a light trap to prevent the passage of any light, around the sides of the focusing screen, into the compartment containing the sensitized film after the focusing screen is drawn into position before the film. The plate 13 has an opening therein adjacent and corresponding with the picture window opening in the plate 8, through one or both of which openings the picture is projected; either upon the surface of the focusing screen or upon the surface of the sensitized film. The front edge of the focusing screen is suitably stiffened in order to keep the screen flat and taut when drawn up and to prevent bulging. Air vents, not shown in the drawings but which are well known in the art, are provided at the base of the bellows and at the front board plate to prevent drawing either the film or the focusing screen out of place accidentally and also to prevent forcing the cover of the viewing aperture open by a too rapid opening or closing of the bellows. Just under the upper corner of the plate 8 is a roller 22 lying in a space formed by the downturned edge 23 of the plate 4, and the curtain 18 may be pulled up to this roller by means of the two tapes 24 and 25, which tapes are attached to two drums 26 and 27 fastened on a shaft 28 which extends through one side of the camera and has a small gear wheel 29 attached thereto at its outer end. The gear wheel 29 is in mesh with a large gear wheel 30 which is carried on a stub shaft 32, the gear 30 being manipulated by means of the ring handle 33. The gear 30 may be slightly moved on its stub shaft, laterally with respect to the side of the camera, so that the pin 34, projecting from the under side of the gear 30, may be engaged with a hole 31 in a plate 39 forming the base of the stub shaft 32 and attached to the side of the camera, for the purpose of locking the gear and holding the curtain in the raised position; or the pin may be disengaged from the hole to permit the curtain to be retracted to its normal position wound up on the roller 19.

Above the upper corner of the plate 8 there is a small roller 35, over which the film 15 passes to the spool 36 and the latter spool is rotated, for the purpose of winding the film, by means of a suitable key 37 carried by the boss 38 in a well known manner. The roller 19 is supported by and is fast to a shaft 40 which projects through one of the side members of the frame and has a small gear wheel 41 attached thereto at its outer end; the latter gear being in mesh with a large hollow gear wheel 42, which has one end of a stiff spiral spring 43 attached thereto. The other end of this spiral spring is attached to a stud, fast to the camera frame, on which the gear 42 turns. The spiral spring is installed under the gear 42 for the purpose of winding the curtain 18 upon the roller 19 by the tension of the spring.

The camera front 44 is hinged to the camera back frame at 45, and is adapted to completely close the front of the camera when the latter is not in use, in a well known manner.

The plate 3 carries a slide 46 upon which the sliding standard 47 is mounted when the camera is closed, and the camera front 44 has a guide 48 upon which the standard 47 slides when the bellows is drawn out. The standard 47, by means of a spring actuated clamp well known in the art, may be guided by the slide 48 or may be frictionally engaged with the movable slide 49, which is an extension of the slide 48, with sufficient force to hold it in any desired position when in use, and the slide 49 may be adjusted in position by means of the pinion 50 on the horizontal shaft 51. A knurled thumb nut 52 is provided to rotate the shaft carrying the pinion 50 which is in mesh with a rack 53 attached to the slide 49.

The front of the bellows is connected with the front board plate 54 which may be moved up and down in the standard 47 to accomplish well known objects in composing the picture upon the screen.

There is an opening through the front board plate 54 to receive a plate or frame 55 having an annular opening through the same, in which the lens tube 56 with the usual shutter is mounted, which frame is movable forward and backward for a purpose presently to be explained.

The front edge of the frame 55 has a flange 57 extending entirely around it. At the back the frame 55 has an opaque flexible septum 58 connected with it by means of the plate 59, which septum is also connected to the back of the front board plate 54 for the purpose of preventing the entrance of any light but permitting the movement of the lens holding frame 55. The plate 59 also carries the springs 60, 61, 62 and 63 bearing on the back of the front board plate 54 and tending to hold the lens holding frame, carrying the lens and shutter, in the retracted position.

At the top of the front board plate 54 there is an opening 64 with a wedge shaped casing 65 covering said opening and having a mirror on its inner front surface. The top of this wedge shaped casing is provided with an opening 67 and with a hinged cap 68 which is adapted to close said opening. The cap 68 is pivotally connected to two links 69 and 70, at a point below its own pivot point 71 so that when the cover is lifted it will draw with it the links 69 and 70 and when the cover is turned over through an arc of 180 degrees it will hold the links in the raised position. At their lower ends, the links 69 and 70 are connected with a slidably movable plate 72 which has a rectangular opening therein to receive the lens holding frame 55, and the said plate 72 is provided with four cams 73, 74, 75 and 76 projecting therefrom and bearing against the bottom portion of the flange 57 when the plate 72 is raised by the movement of the links 69 and 70, but the cams set in four notches provided in the said flange when the plate 72 is lowered by the act of closing the cap 68.

In operation the bellows is pulled out as shown in Fig. 1. The handle 35 is then turned to raise the focusing screen into position in front of the film, the pin 34 locking the gear to hold the curtain. The cap 68 is then turned back and with the lens shutter open the camera is directed toward the object to be photographed. The operator can then view, either a portion of the focusing screen directly by looking through the opening 67, or can see all of the screen indirectly by means of the mirror 66 when one eye is placed close to the viewing aperture 67. When the cap 68 is lifted the plate 72 is raised moving the lens forward by the action of the cams against the flange 57, through precisely the same space as the distance from the sensitized surface of the film to the front surface of the focusing screen. After the focus has been obtained the cap 68 and the lens shutter are closed and the focusing screen is allowed to re-wind on the roller 19, whereupon the picture may be taken.

Having thus described my invention what I claim as new and desire to secure by Letters Patent of the United States, is as follows, express reservation being made of permissible modifications:

1. A focusing device for cameras comprising a camera having a focusing opening in its front, a lens, a screen adapted to be moved to a plane in front of the sensitized surface on which the photograph is to be taken, means to focus the lens on the screen, a cover for the focusing opening in the front part of the camera through which the picture may be viewed, and means operated by said cover to move the lens forward a distance corresponding to the distance of the screen surface from the sensitized surface when the picture on the screen is examined.

2. A focusing device for cameras comprising a camera having a focusing opening in its front, a lens therefor, a screen movable to a position in front of the sensitized surface, means to focus the lens, a hinged cover for the focusing opening at the front of the camera, links depending therefrom and a frame having cams to move the lens forward the distance of the screen from the sensitized surface when the cover and links connected thereto lift said frame.

3. A focusing device for cameras comprising a camera having a focusing opening in its front, a flexible diaphragm carrying a lens, a screen movable to a position in front of the sensitized surface, means to focus the lens, a hinged cover for the focusing opening at the front of the camera, links depending therefrom and a frame having cams to move the lens forward the distance of the screen from the sensitized surface when the cover and links connected thereto lift said frame.

In testimony whereof I have hereunto set my hand this 30th day of April, A. D. 1918.

STAFFORD P. WALSH.

Copies of this patent may be obtained for five cents each, by addressing the "Commissioner of Patents, Washington, D. C."